United States Patent
Lan et al.

(10) Patent No.: US 8,363,380 B2
(45) Date of Patent: Jan. 29, 2013

(54) MEMS VARACTORS

(75) Inventors: Je-Hsiung Lan, Cupertino, CA (US);
Evgeni P. Gousev, Saratoga, CA (US);
Wenyue Zhang, San Jose, CA (US);
Manish Kothari, Cupertino, CA (US);
Sang-June Park, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 12/473,882

(22) Filed: May 28, 2009

(65) Prior Publication Data
US 2011/0109383 A1 May 12, 2011

(51) Int. Cl.
*H01G 7/00* (2006.01)
*H01G 7/06* (2006.01)
(52) U.S. Cl. .......................... 361/281; 361/303
(58) Field of Classification Search .......... 361/303, 361/311, 277, 290, 280, 281
See application file for complete search history.

(56) References Cited

U.S. PATENT DOCUMENTS

| | | | | |
|---|---|---|---|---|
| 6,229,684 | B1 * | 5/2001 | Cowen et al. | 361/278 |
| 6,426,687 | B1 | 7/2002 | Osborn | |
| 6,980,412 | B2 * | 12/2005 | Cheng et al. | 361/277 |
| 2002/0025595 | A1 | 2/2002 | Xu et al. | |
| 2006/0226501 | A1 * | 10/2006 | Allen Chou | 257/415 |
| 2007/0183116 | A1 * | 8/2007 | Combi et al. | 361/277 |
| 2007/0268095 | A1 | 11/2007 | Chou | |

FOREIGN PATENT DOCUMENTS

| | | |
|---|---|---|
| EP | 1429413 | 6/2004 |
| WO | WO0052722 | 9/2000 |
| WO | WO2004055935 | 7/2004 |

OTHER PUBLICATIONS

International Search Report and Written Opinion—PCT/US2010/036746, International Search Authority—European Patent Office—Sep. 29, 2010.

* cited by examiner

*Primary Examiner* — Eric Thomas
(74) *Attorney, Agent, or Firm* — Knobbe Martens Olson & Bear LLP

(57) ABSTRACT

MEMS varactors capable of handling large signals and/or achieving a high capacitance tuning range are described. In an exemplary design, a MEMS varactor includes (i) a first bottom plate electrically coupled to a first terminal receiving an input signal, (ii) a second bottom plate electrically coupled to a second terminal receiving a DC voltage, and (iii) a top plate formed over the first and second bottom plates and electrically coupled to a third terminal. The DC voltage causes the top plate to mechanically move and vary the capacitance observed by the input signal. In another exemplary design, a MEMS varactor includes first, second and third plates formed on over one another and electrically coupled to first, second and third terminals, respectively. First and second DC voltages may be applied to the first and third terminals, respectively. An input signal may be passed between the first and second terminals.

25 Claims, 9 Drawing Sheets

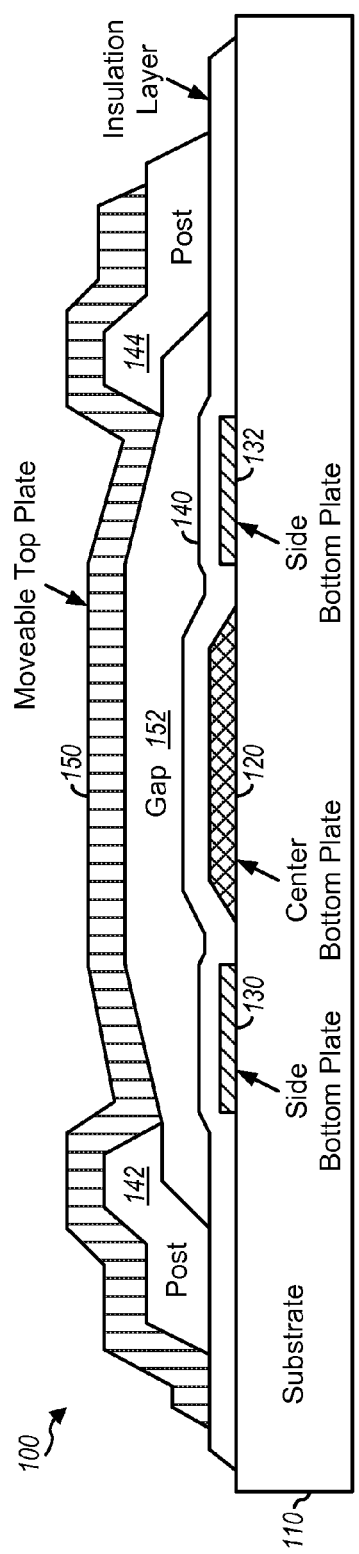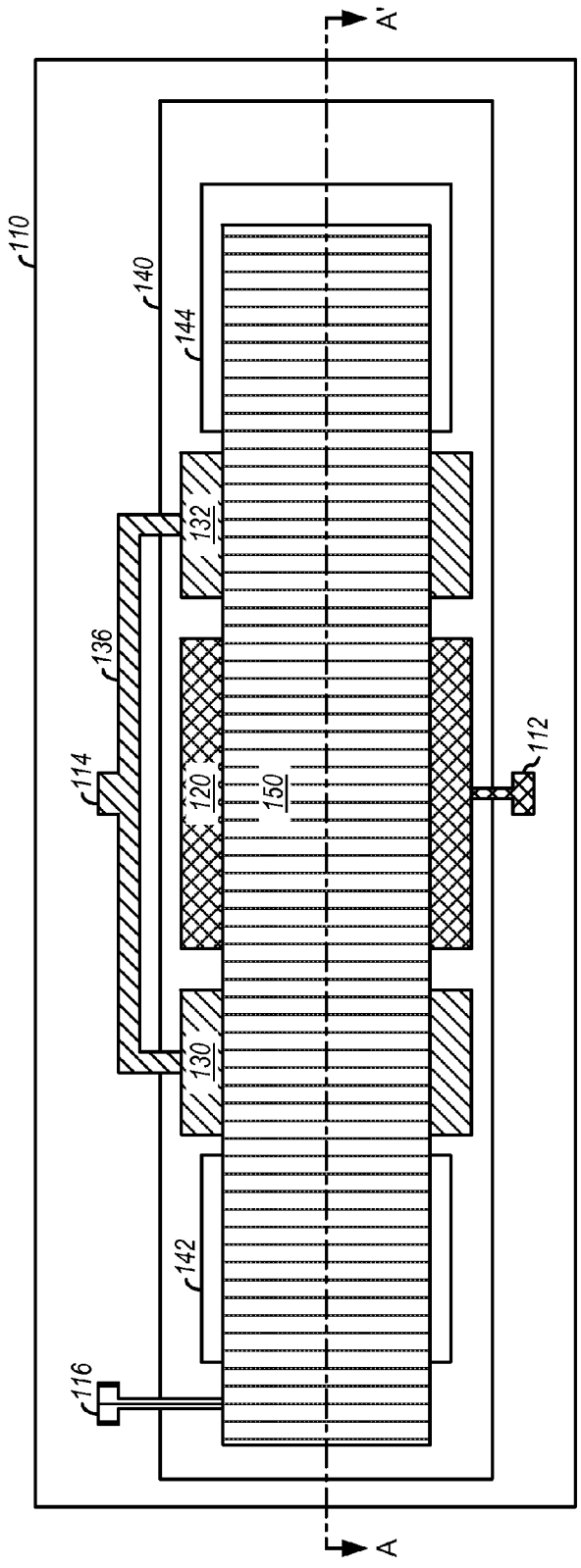

MEMS VARACTORS

BACKGROUND

I. Field

The present disclosure relates generally to electronics, and more specifically to micro-electro-mechanical system (MEMS) varactors.

II. Background

MEMS is a technology used to form miniature electro-mechanical devices with mechanical moving parts. These devices may be used to implement various radio frequency (RF) circuit components such as variable capacitors (varactors), switches, resonators, inductors, etc. MEMS devices may have certain advantages over RF circuit components fabricated in other manners, such as higher quality factor (Q), lower insertion loss, better linearity, etc.

A MEMS varactor typically includes two terminals or electrodes. One terminal is typically used for a common terminal, which may be for circuit ground or some other common connection. The other terminal may be used for both an RF signal and a direct current (DC) voltage. The DC voltage may be varied to mechanically move a plate within the MEMS varactor, which may then adjust the capacitance of the MEMS varactor. The RF signal may be passed through the MEMS varactor and may have its characteristics (e.g., frequency, amplitude, etc.) altered by the capacitance of the MEMS varactor.

The 2-terminal MEMS varactor described above may be used for a low-power application with a small RF signal. In this case, the capacitance of the MEMS varactor may not be varied too much by the RF signal. However, the RF signal may be relatively large for a high-power application, such as a transmitter of a wireless communication device. If a large RF signal is applied to the MEMS varactor, then the capacitance of the MEMS varactor may be varied by a large amount due to a large root mean square (RMS) voltage of the RF signal, which may be undesirable. A MEMS varactor that can handle a large RF signal, with little or acceptable changes in capacitance due to the large RF signal, would be desirable.

BRIEF DESCRIPTION OF THE DRAWINGS

FIGS. 1 and 2 show a MEMS varactor with three terminals.

DETAILED DESCRIPTION

Figure 3A:
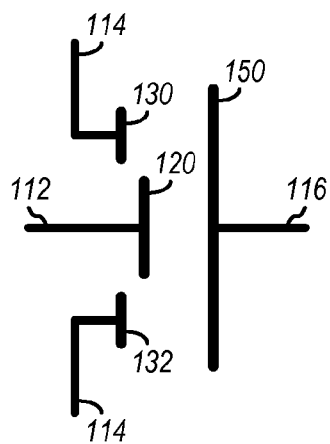
FIGS. 3A to 3D show different operational modes of the MEMS varactor in FIGS. 1 and 2.

The word "exemplary" is used herein to mean "serving as an example, instance, or illustration." Any design described herein as "exemplary" is not necessarily to be construed as preferred or advantageous over other designs.

Various exemplary designs of MEMS varactors are described herein. These MEMS varactors may be used for various circuits such as tunable filters, tunable antennas, etc. Some of these MEMS varactors may be able to handle large RF signals and may be used for high-power applications. For example, the MEMS varactors may be used for a transmitter of a wireless communication device, which may be required to provide a large output power, e.g., 36 dBm for a power amplifier in GSM. The MEMS varactors may be able to handle a large RF signal and may have a small change in capacitance due to the large RF signal. Some of the MEMS varactors may also be able to achieve a high capacitance tuning range.

In an aspect, MEMS varactors with three or more terminals may be implemented with a horizontal structure. For a MEMS varactor with the horizontal structure, bottom plates for an RF signal and a DC voltage may be formed on the same level. A movable top plate may be formed over the bottom plates and may be mechanically moved to vary the capacitance of the MEMS varactor.

FIG. 1 shows a top view of an exemplary design of a MEMS varactor 100 implemented with the horizontal structure. MEMS varactor 100 includes three terminals. Different operating modes may be supported by applying an RF signal and a DC voltage to the three terminals in different manners, as described below.

FIG. 2 shows a cross-sectional view of MEMS varactor 100 in FIG. 1. The cross-sectional view in FIG. 2 is taken along line A-A' in FIG. 1.

As shown in FIGS. 1 and 2, MEMS varactor 100 includes a center bottom plate 120 and side bottom plates 130 and 132 formed on top of a substrate 110. Substrate 110 may be glass, silicon, or some other material. Glass may have better performance as well as lower cost. Center bottom plate 120 may be formed in a metal layer or some other conductive layer. Side bottom plates 130 and 132 may also be formed in the metal layer or some other conductive layer. Center bottom plate 120 and side bottom plates 130 and 132 may be formed in the same layer (as shown in FIG. 2) or in different layers. An insulation layer 140 may be formed over bottom plates 120, 130 and 132 with dielectric or some other non-conductive material that can provide electrical insulation.

In the exemplary design shown in FIGS. 1 and 2, posts 142 and 144 may be formed over insulation layer 140 outside of bottom plates 130 and 132, respectively. In another exemplary design, bottom plates 130 and/or 132 may extend underneath posts 142 and/or 144, respectively. In any case, posts 142 and 144 may be formed with oxide or some other material. A moveable top plate 150 may be formed over posts 142 and 144 and may be separated from bottom plates 120, 130 and 132 by a gap 152. Top plate 150 may be formed with a conductive material and may also be referred to as a mechanical membrane, a mechanical electrode, etc.

As shown in FIG. 1, a first terminal 112 may be formed on one side of center bottom plate 120. Side bottom plates 130 and 132 may be connected by a conductor 136, and a second terminal 114 may be formed on conductor 136. A third terminal 116 may be formed on one side of top plate 150.

MEMS varactor 100 operates as follows. A fixed DC voltage may be applied to terminal 116. A variable DC voltage may be applied to terminal 112 or 114. The voltage difference between the variable DC voltage applied to terminal 112 or 114 and the fixed DC voltage applied to terminal 116 causes top plate 150 to move down. A large voltage difference would cause top plate 150 to move down more, which would then result in a larger capacitance for MEMS varactor 100. The converse would be true for a smaller voltage difference.

For example, terminal 116 may be coupled to circuit ground, and a variable DC voltage may be applied to terminal 112 or 114. A smallest capacitance $C_{min}$ may be obtained with zero Volts applied to terminal 112 or 114, which would cause top plate 150 to rest at its normal position that is farthest away from bottom plates 120, 130 and 132. A largest capacitance $C_{max}$ may be obtained with a sufficient voltage applied to terminal 112 or 114, which would cause top plate 150 to move toward bottom plates 120, 130 and 132 and rest on insulation layer 140. The voltage used to obtain $C_{max}$ is referred to as a pull-in voltage $V_{pull-in}$.

FIG. 3A shows a schematic diagram of MEMS varactor 100. Center bottom plate 120 is coupled to terminal 112, side bottom plates 130 and 132 are both coupled to terminal 114, and top plate 150 is coupled to terminal 116. An RF signal and a DC voltage may be applied to terminals 112 and 114 in several manners, as described below.

Figure 3B:
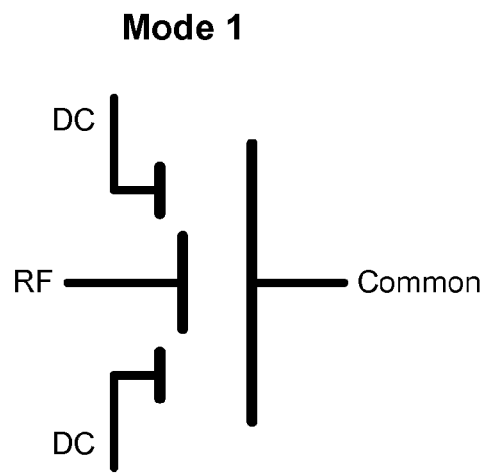

FIG. 3B shows a first operational mode (mode 1) for MEMS varactor 100. In this mode, an RF signal is applied to terminal 112 coupled to center bottom plate 120. A DC voltage is applied to terminal 114 coupled to side bottom plates 130 and 132. The first mode may be used to obtain a large capacitance tuning range, i.e., a large $C_{max}/C_{min}$.

Figure 3C:
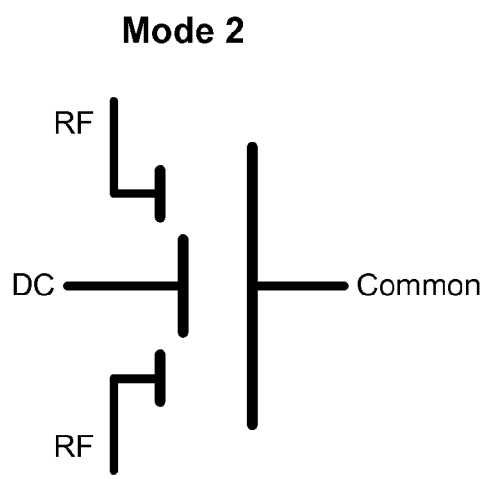

FIG. 3C shows a second operational mode (mode 2) for MEMS varactor 100. In this mode, a DC voltage is applied to terminal 112 coupled to center bottom plate 120. An RF signal is applied to terminal 114 coupled to side bottom plates 130 and 132. Movable top plate 150 is more stiff at the two ends near posts 142 and 144 and is less stiff toward the central area. Thus, top plate 150 may move less when a large RF signal is applied to side bottom plates 130 and 132, due to greater stiffness of top plate 150 at the two ends. This may result in less change in capacitance due to the larger RF signal. Operating MEMS varactor 100 in the second mode may result in less sensitivity to higher power (or higher RMS voltage) of the RF signal.

Figure 3D:
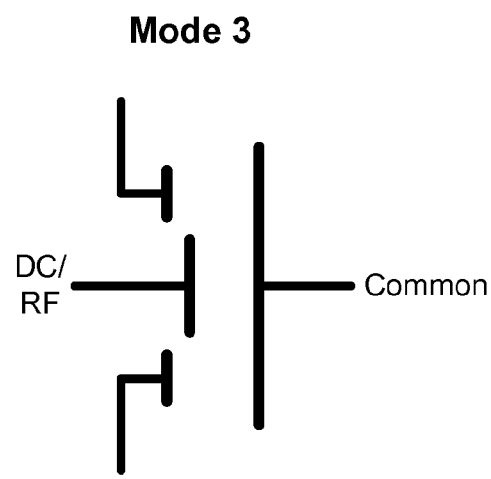

FIG. 3D shows a third operational mode (mode 3) for MEMS varactor 100. In this mode, an RF signal and a DC voltage are both applied to terminal 112 coupled to center bottom plate 120. Because movable top plate 150 is less stiff toward the central area, a smaller DC voltage may be used to obtain $C_{max}$ in the third mode.

Table 1 summarizes the three operational modes for MEMS varactor 100. Table 1 also gives $C_{min}$, $C_{max}$, capacitance tuning range ($C_{max}/C_{min}$), and pull-in voltage $V_{pull-in}$ for each of the three modes for an exemplary design of MEMS varactor 100.

TABLE 1

|  | Mode 1 | Mode 2 | Mode 3 |
| --- | --- | --- | --- |
| RF signal applied to ... | Terminal 112 | Terminal 114 | Terminal 112 |
| DC voltage applied to ... | Terminal 114 | Terminal 112 | Terminal 112 |
| $C_{min}$ (with 0 V applied) | 0.05 pF | 0.10 pF | 0.08 pF |
| $C_{max}$ (with $V_{pull-in}$ applied) | 0.91 pF | 0.16 pF | 0.94 pF |
| Capacitance tuning range ($C_{max}/C_{min}$) | 18.2 | 1.6 | 11.8 |
| Pull-in voltage $V_{pull-in}$ | 16.0 V | 8.5 V | 6.2 V |

In general, $C_{min}$ and $C_{max}$ may be dependent on the size of the bottom plate(s) to which the RF signal is applied. A larger capacitance may be obtained with a larger plate size, and vice versa. $C_{min}$ may be obtained with the top plate being farthest from the bottom plate(s) and may be further dependent on the gap distance between the top plate and the bottom plate(s). Smaller $C_{min}$ may be obtained with a larger gap, and vice versa.

In the first mode, $C_{min}$ and $C_{max}$ may be determined by the size of bottom plate 120, and $C_{min}$ may be determined further by the gap distance between bottom plate 120 and top plate 150. In the second mode, $C_{min}$ and $C_{max}$ may be determined mostly by the size of bottom plates 130 and 132. In the third mode, $C_{min}$ and $C_{max}$ may be determined by the size of bottom plate 120, and $C_{min}$ may be determined further by the gap distance between bottom plate 120 and top plate 150. The desired $C_{min}$ and $C_{max}$ may be obtained (i) with an appropriate size for the bottom plate(s) to which the RF signal is applied, (ii) with an appropriate gap distance between the bottom plate(s) and the top plate, and/or (iii) by varying other characteristics or parameters of MEMS varactor 100.

As shown in Table 1, the first mode may be well suited for binary/digital applications, e.g., with the RF signal being switched on and off. The second mode may be well suited for high-power applications. The third mode may be well suited for low-bias applications.

Figure 4:
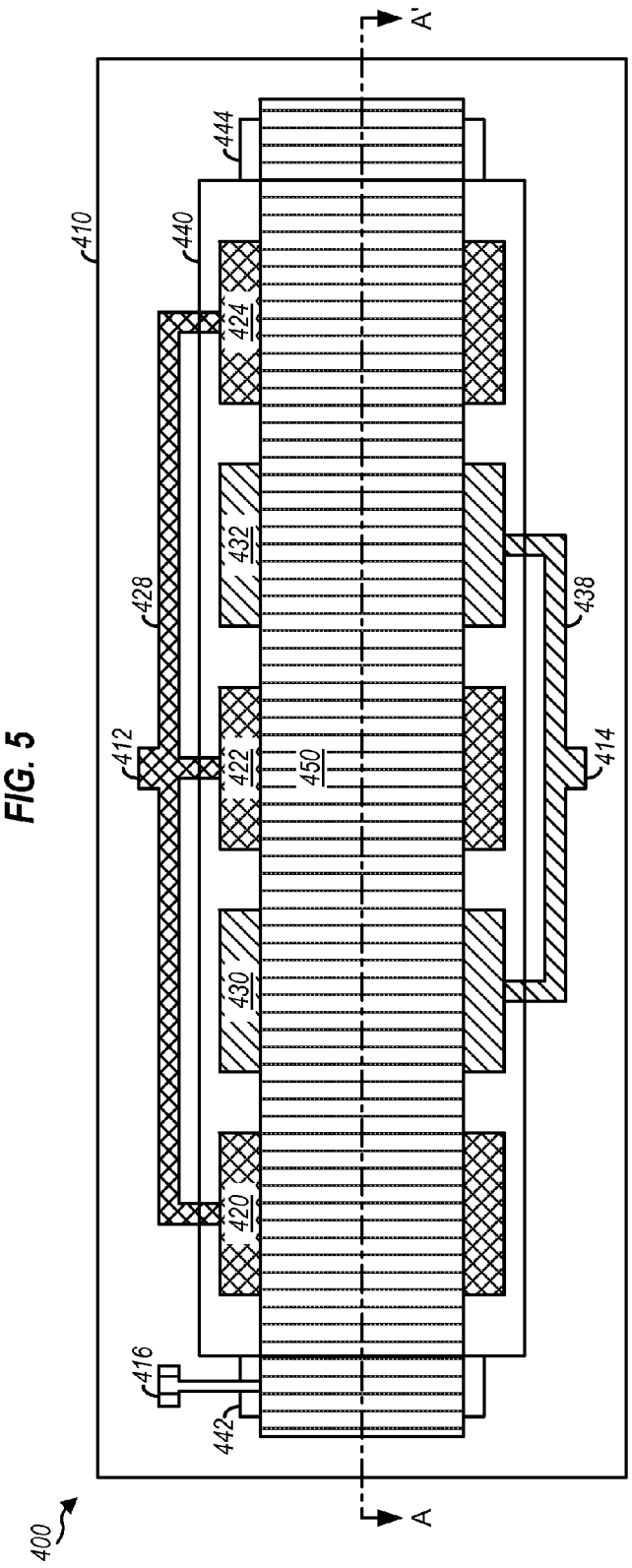
FIGS. 4 and 5 show another MEMS varactor with three terminals.

FIG. 4 shows a top view of an exemplary design of a MEMS varactor 400 with three terminals.

Figure 5:
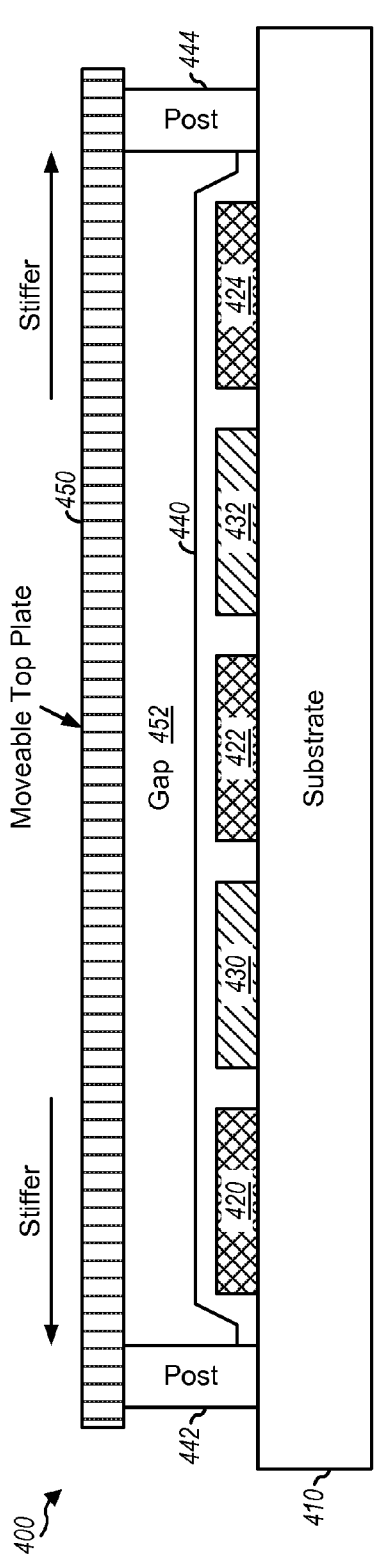

FIG. 5 shows a cross-sectional view of MEMS varactor 400 in FIG. 4. The cross-sectional view in FIG. 5 is taken along line A-A' in FIG. 4.

As shown in FIGS. 4 and 5, MEMS varactor 400 includes a first set of bottom plates 420, 422 and 424 and a second set of bottom plates 430 and 432 formed on top of a substrate 410. Substrate 410 may be glass or some other material. Bottom plates 420 to 432 may be formed in a metal layer or some other conductive layer. An insulation layer 440 may be formed over bottom plates 420 to 432 with a non-conductive material.

Posts 442 and 444 may be formed with oxide or some other material over insulation layer 440 outside of bottom plates 420 and 424, respectively. A moveable top plate 450 may be formed with a conductive material over posts 442 and 444 and may be separated from bottom plates 420 to 432 by a gap 452. Top plate 450 may move down when a DC voltage is applied, may be stiffer at the two ends near posts 442 and 444, and may be less stiff near the central area.

As shown in FIG. 4, a conductor 428 may connect bottom plates 420, 422 and 424 and may be coupled to a first terminal 412. A conductor 438 may connect bottom plates 430 and 432 and may be coupled to a second terminal 414. A third terminal 416 may be formed on one side of top plate 450.

In a first mode, an RF signal may be applied to terminal 412, and a DC voltage may be applied to terminal 414. In a second mode, the RF signal may be applied to terminal 414, and the DC voltage may be applied to terminal 412. In a third mode, the RF signal and the DC voltage may both be applied to terminal 412. In a fourth mode, the RF signal and the DC voltage may both be applied to terminal 414. Different varactor characteristics (e.g., $C_{min}$, $C_{max}$, capacitance tuning range, and $V_{pull-in}$) may be obtained for the four modes.

FIGS. 1 and 2 show an exemplary design of MEMS varactor 100 with three bottom plates 120, 130 and 132 formed under top plate 150. FIGS. 4 and 5 show an exemplary design of MEMS varactor 400 with five bottom plates 420, 422, 424, 430 and 432 formed under top plate 450. In general, any number of bottom plates may be formed under a top plate. More bottom plates may provide more freedom to obtain the desired varactor characteristics and may also allow for greater control of capacitance change due to signal swing. The bottom plate(s) for the RF signal and the bottom plate(s) for the DC voltage may be arranged in a comb-like structure, as shown in FIGS. 1, 2, 4 and 5, or may be arranged in other manners, e.g., with circular shape structures.

Figure 6A:
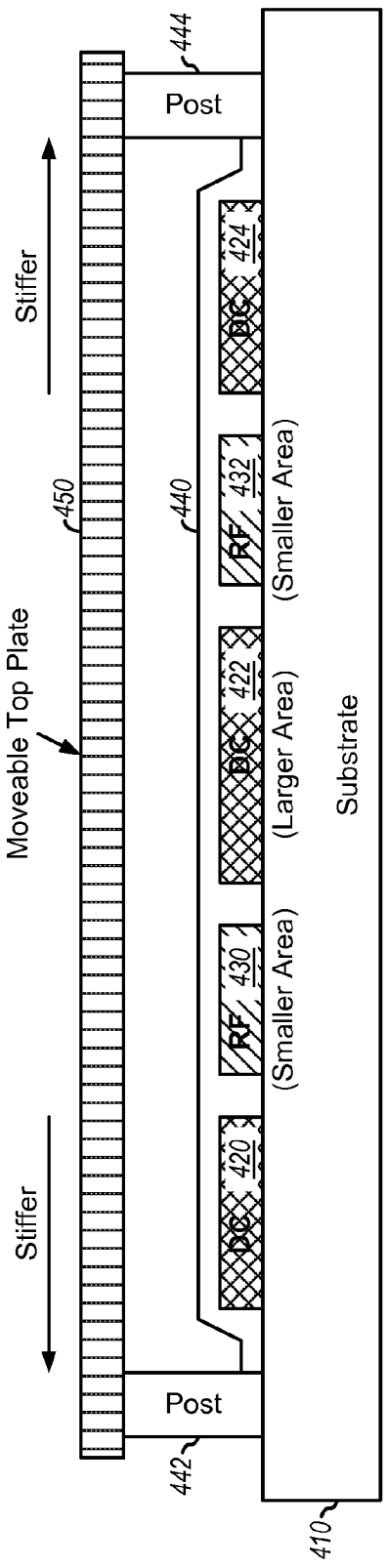
FIGS. 6A to 6D show different schemes for controlling changes to the capacitance of a MEMS varactor for a large RF signal.

FIG. 6A shows an exemplary design for controlling changes in capacitance due to electro-static force from a large RF signal applied to MEMS varactor 400 in FIG. 4. In this exemplary design, the capacitance change may be controlled by selecting suitable sizes for the bottom plates and exploiting the greater stiffness of the top plate near the two posts. In particular, less capacitance change due to the large RF signal may be obtained by (i) applying the RF signal to bottom plates 430 and 432, which are formed under a stiffer portion of top plate 450 than bottom plate 422, and (ii) forming bottom plates 430 and 432 with smaller areas than bottom plates 420, 422 and 424 for the DC voltage.

Figure 6B:
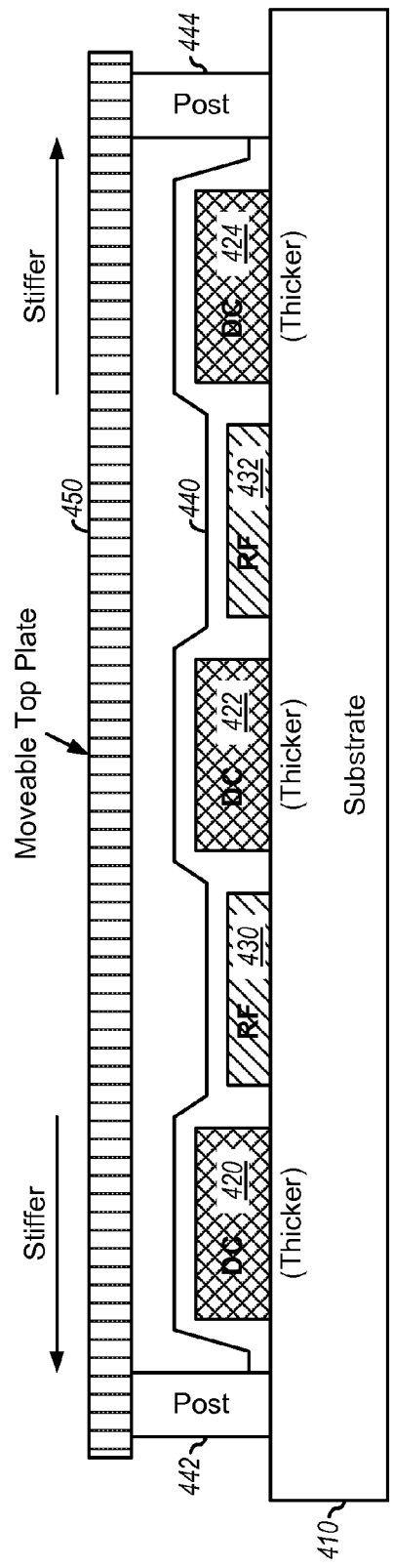

FIG. 6B shows another exemplary design for controlling changes in capacitance due to electro-static force from a large RF signal applied to MEMS varactor 400 in FIG. 4. In this exemplary design, the capacitance change may be controlled by selecting suitable gap distance between the top plate and the bottom plates. In particular, less capacitance change due to the large RF signal may be obtained by having (i) a larger gap for bottom plates 430 and 432 to which the RF signal is applied and (ii) a smaller gap for bottom plates 420, 422 and 424 to which the DC voltage is applied. In general, a larger gap for the bottom plates for the RF signal may result in smaller capacitance change due to the RF signal.

Figure 6C:
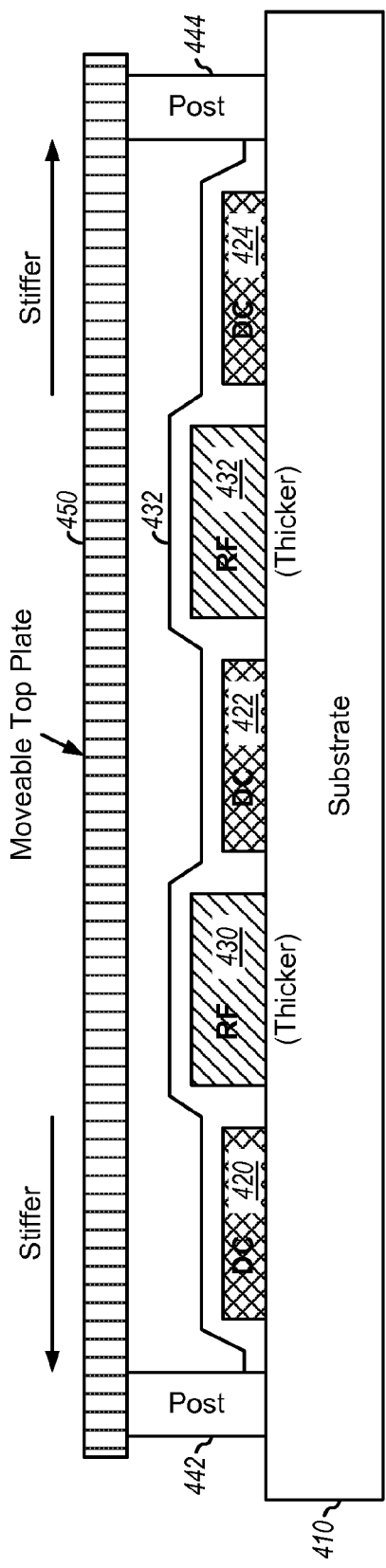

FIG. 6C shows an exemplary design for obtaining larger capacitance and/or larger capacitance tuning range for MEMS varactor 400 in FIG. 4. In this exemplary design, the capacitance and/or capacitance tuning range may be increased by having (i) a larger gap for bottom plates 420, 422 and 424 to which the DC voltage is applied and (ii) a smaller gap for bottom plates 430 and 432 to which the RF signal is applied.

Figure 6D:
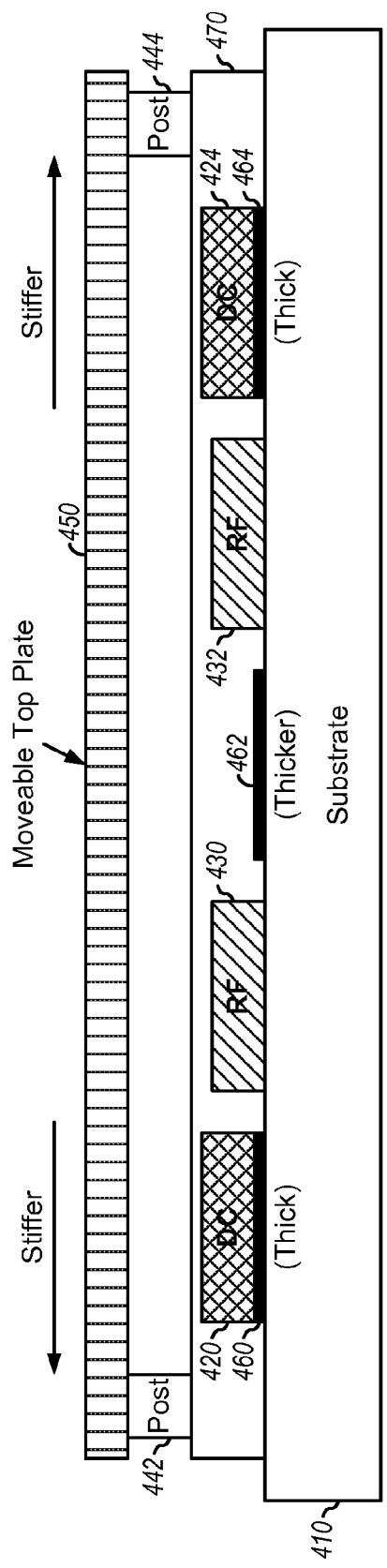

FIG. 6D shows another exemplary design for controlling changes in capacitance due to electro-static force from a large RF signal. In this exemplary design, a thin film resistor (TFR) 460 may be formed between bottom plate 420 and substrate 410. A thin film resistor 464 may be formed between bottom plate 424 and substrate 410. A thin film resistor 462 may be formed on substrate 410 instead of bottom plate 422. A planarization layer 470 may be formed over bottom plates 420 to 432 with spin-coating techniques and may provide electrical isolation.

As shown in FIG. 6D, the gap may vary across top plate 450, with bottom plates progressively closer to the center of the top plate having progressively larger gap. This may decrease the DC pull-in voltage and improve the tuning ratio.

In another aspect, MEMS varactors with three or more terminals may be implemented with a vertical structure. For a MEMS varactor with the vertical structure, three (or possibly more) plates may be stacked vertically (i.e., placed in parallel) and coupled to three (or possibly more) terminals. A middle plate may be mechanically moved to vary the capacitance of the MEMS varactor.

Figure 7:
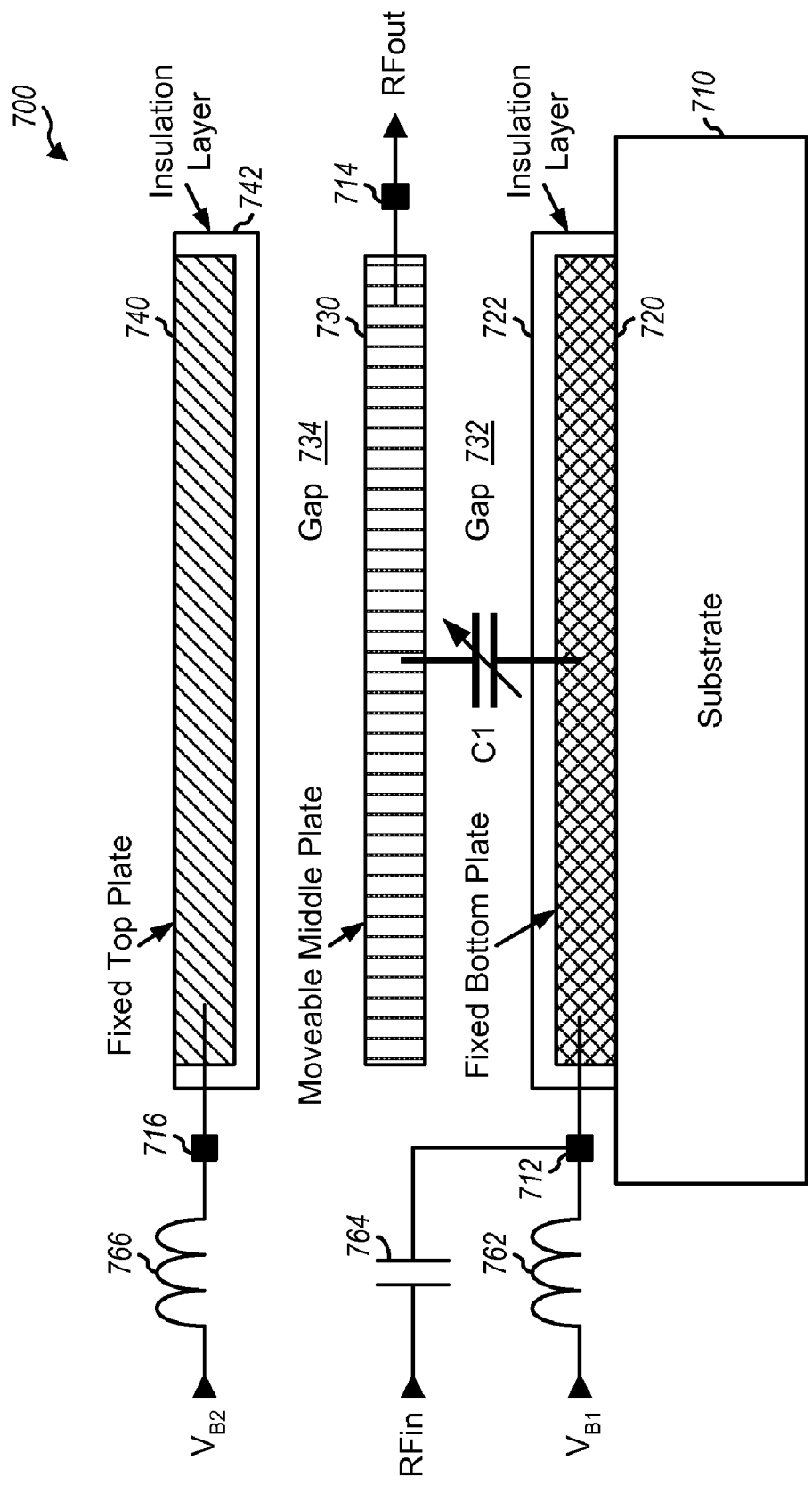
FIGS. 7 and 8 show two MEMS varactors with vertically stacked plates.

FIG. 7 shows a cross-sectional view of an exemplary design of a MEMS varactor 700 implemented with the vertical structure. MEMS varactor 700 includes a bottom plate 720 formed on top of a substrate 710. Substrate 710 may be glass or some other material. Bottom plates 720 may be formed in a metal layer or some other conductive layer. An insulation layer 722 may be formed over bottom plate 720 with a non-conductive material. A moveable middle plate 730 may be formed with a conductive material over bottom plate 720 and may be separated from the bottom plate by a gap 732. A top plate 740 may be formed with a conductive material over middle plate 730 and may be separated from the middle plate by a gap 734. An insulation layer 742 may be formed below top plate 740 with a non-conductive material.

In the exemplary design shown in FIG. 7, a terminal 712 may be formed on one end of bottom plate 720, a terminal 714 may be formed on one end of middle plate 730, and a terminal 716 may be formed on one end of top plate 740. A first DC voltage $V_{B1}$ may be applied via an RF choke 762 (or a resistor) to terminal 712. An input RF signal (RFin) may be applied via a DC blocking capacitor 764 to terminal 712. A second DC voltage $V_{B2}$ may be applied via an RF choke 766 (or a resistor) to terminal 716. An output RF signal (RFout) may be provided via terminal 714.

Middle plate 730 may move up or down due to the DC voltages applied to bottom plate 720 and top plate 740. Insulation layers 722 and 742 prevent middle plate 730 from shorting to bottom plate 720 or top plate 740, respectively. A variable capacitor C1 may be formed between middle plate 730 and bottom plate 720. The capacitance of C1 may be determined by the sizes of middle plate 730 and bottom plate 720 as well as the gap distance between these two plates.

Top plate 740 may be used to compensate or reduce capacitance change due to the input RF signal applied to bottom plate 720. A power detection unit may measure the signal swing of the input RF signal. The second DC voltage may be adjusted based on the measured RF signal swing. For example, a larger input RF signal may pull middle plate 730 toward bottom plate 720 and may increase the capacitance C1. A larger DC voltage may then be applied to top plate 740 to pull middle plate 730 toward top plate 740 and counter the pull by the larger input RF signal.

Figure 8:
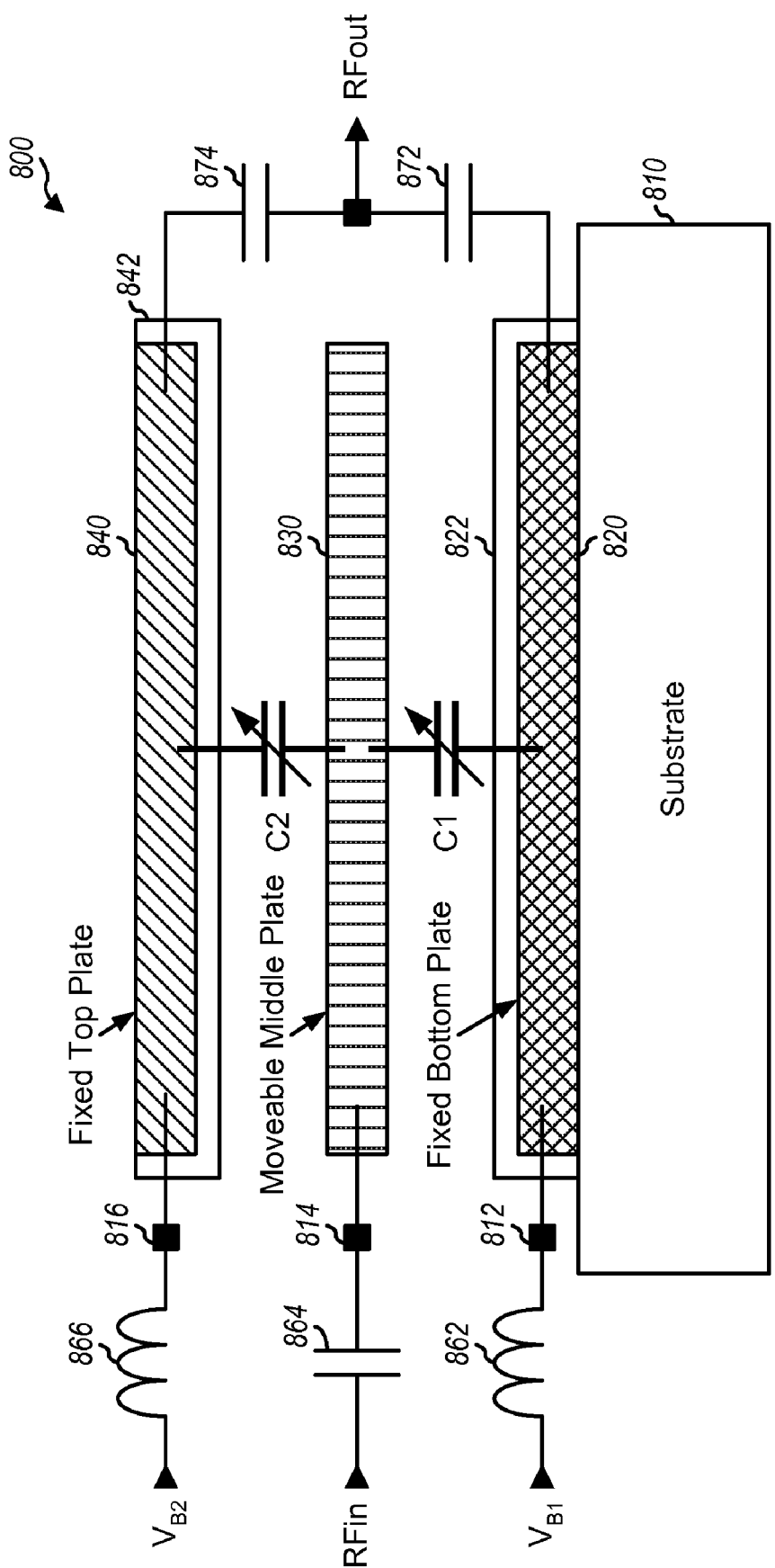

FIG. 8 shows a cross-sectional view of an exemplary design of a MEMS varactor 800 implemented with the vertical structure. MEMS varactor 800 includes a bottom plate 820 formed over a substrate 810, a movable middle plate 830, a top plate 840, and insulation layers 822 and 842, as described above for MEMS varactor 700 in FIG. 7.

A terminal 812 may be formed on one end of bottom plate 820, a terminal 814 may be formed on one end of middle plate 830, and a terminal 816 may be formed on one end of top plate 840. A first DC voltage $V_{B1}$ may be applied via an RF choke 862 to terminal 812. An input RF signal may be applied via a DC blocking capacitor 864 to terminal 814. A second DC voltage $V_{B2}$ may be applied via an RF choke 866 to terminal 716. An output RF signal may be provided via DC blocking capacitors 872 and 874, which may be coupled to bottom plate 820 and top plate 840, respectively.

Middle plate 830 may move up or down due to the DC voltages applied to bottom plate 820 and top plate 840. A first variable capacitor C1 may be formed between middle plate 830 and bottom plate 820. A second variable capacitor C2 may be formed between top plate 840 and middle plate 830. The capacitance of C1 may be determined by the sizes of plates 820 and 830 as well as the gap distance between these two plates. The capacitance of C2 may be determined by the sizes of plates 830 and 840 as well as the gap distance between these two plates. The total capacitance between the output RF signal and the input RF signal may be given as $C_{total} = C1 + C2$.

FIGS. 1 through 6B show some exemplary designs of MEMS varactors with the horizontal structure. An RF signal may be applied to bottom plates located near the posts where the top plate has greater stiffness. This may result in smaller impact/deflection due to a large signal swing of the RF signal. Alternatively, the RF signal may be applied to bottom plates located away from the posts. This may result in a larger capacitance tuning range.

FIGS. 7 and 8 show some exemplary designs of MEMS varactors with the vertical structure. An RF signal may be applied to a bottom plate or a middle plate of an MEMS varactor. A second DC voltage may be applied to a top plate formed over the movable plate to compensate for and reduce capacitance change due to a large signal swing of the RF signal.

The MEMS varactors described herein may provide certain advantages over conventional MEMS varactors. First, the MEMS varactors described herein may be able to handle a larger signal swing. This capability may be especially beneficial for a high-power application such as a transmitter of a wireless communication device. Second, the capacitance tuning range may be controlled independently by a DC voltage with the horizontal structure. A larger capacitance tuning range may be obtained with the vertical structure. For both the horizontal and vertical structures, the varactor characteristics may also be controlled by selecting appropriate plate sizes, plate thickness, and gap distance, e.g., as described above for FIGS. 6A to 6D. The vertical structure may have other advantages, such as better thermal stability, which may be desirable for practical product applications. Furthermore, varactor capacitance change due to temperature may be compensated with the top and the bottom plates. In comparison to a varactor with a single electrode (which can only increase the varactor capacitance), the vertical structure can compensate for both capacitance increase/decrease due to increase/decrease of temperature.

The MEMS varactors described herein may be used for various electronics devices such as wireless communication devices, cellular phones, personal digital assistants (PDAs), handheld devices, wireless modems, laptop computers, cordless phones, broadcast receivers, Bluetooth devices, consumer electronics devices, etc. The use of the MEMS varactors in a wireless communication device, which may be a cellular phone or some other device, is described below.

Figure 9:
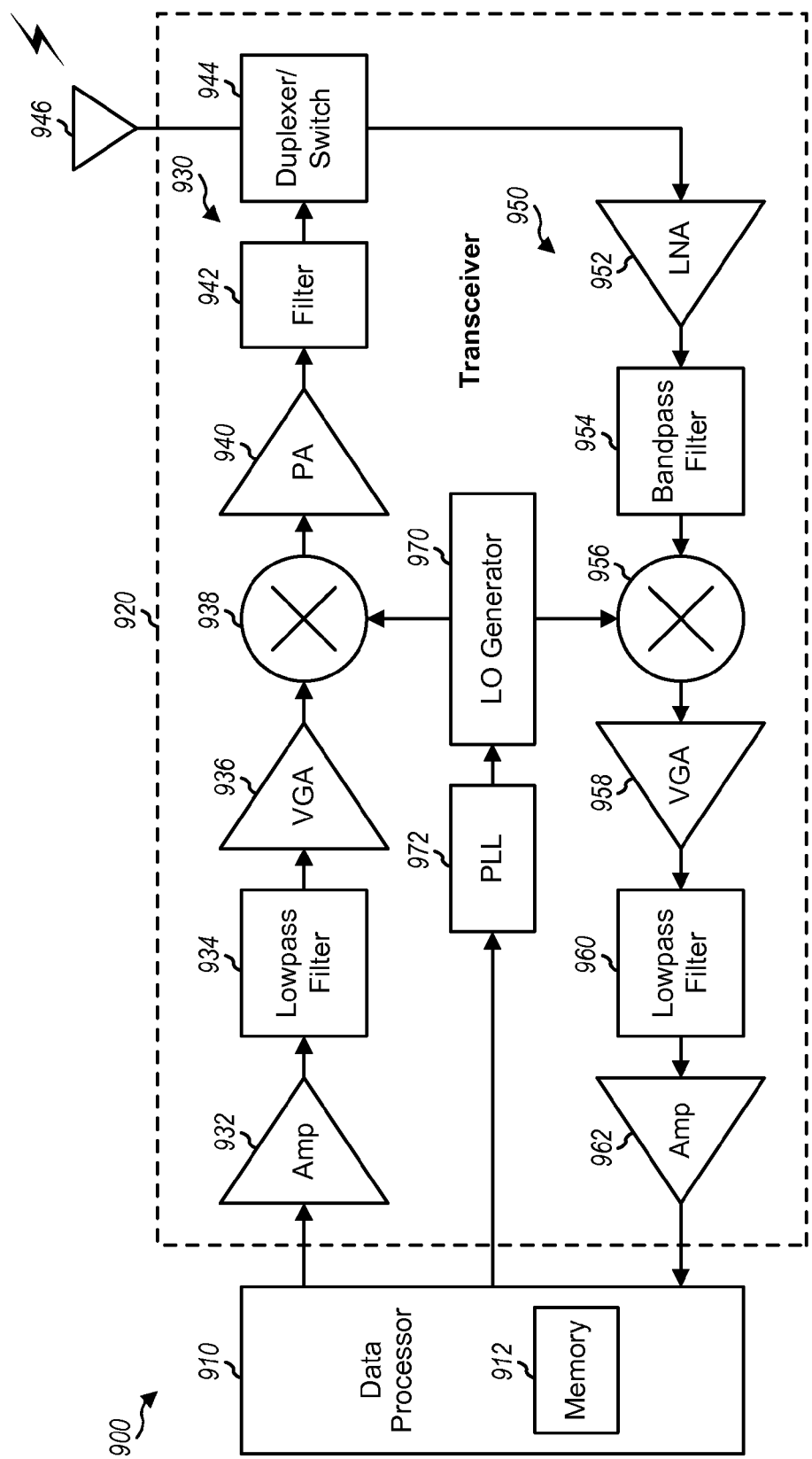
FIG. 9 shows a block diagram of a wireless communication device.

FIG. 9 shows a block diagram of an exemplary design of a wireless communication device 900. In this exemplary design, wireless device 900 includes a data processor 910 and a transceiver 920. Transceiver 920 includes a transmitter 930 and a receiver 950 that support bi-directional wireless communication. In general, wireless device 900 may include any number of transmitters and any number of receivers for any number of communication systems and any number of frequency bands.

In the transmit path, data processor 910 processes data to be transmitted and provides an analog output signal to transmitter 930. Within transmitter 930, the analog output signal is amplified by an amplifier (Amp) 932, filtered by a lowpass filter 934 to remove images caused by digital-to-analog conversion, amplified by a variable gain amplifier (VGA) 936, and upconverted from baseband to RF by an upconverter 938. The upconverted signal is amplified by a power amplifier (PA) 940, further filtered by a filter 942 to remove images caused by the frequency upconversion, routed through a duplexer/switch 944, and transmitted via an antenna 946. Filter 942 may be implemented with a MEMS notch filter that can handle high power from PA 940. Filter 942 may be located after PA 940 (as shown in FIG. 9) or prior to PA 940.

In the receive path, antenna 946 receives signals from base stations and provides a received signal, which is routed through duplexer/switch 944 and provided to receiver 950. Within receiver 950, the received signal is amplified by a low noise amplifier (LNA) 952, filtered by a bandpass filter 954, and downconverted from RF to baseband by a downconverter 956. The downconverted signal is amplified by a VGA 958, filtered by a lowpass filter 960, and amplified by an amplifier 962 to obtain an analog input signal, which is provided to data processor 910.

FIG. 9 shows transmitter 930 and receiver 950 implementing a direct-conversion architecture, which frequency converts a signal between RF and baseband in one stage. Transmitter 930 and/or receiver 950 may also implement a super-heterodyne architecture, which frequency converts a signal between RF and baseband in multiple stages. A local oscillator (LO) generator 970 generates and provides transmit LO signals for upconverter 938 and receive LO signals for downconverter 956. A phase locked loop (PLL) 972 receives control information from data processor 910 and provides control signals to LO generator 970 to generate the transmit and receive LO signals at the proper frequencies.

FIG. 9 shows an exemplary transceiver design. In general, the conditioning of the signals in transmitter 930 and receiver 950 may be performed by one or more stages of amplifier, filter, mixer, etc. These circuits may be arranged differently from the configuration shown in FIG. 9. Furthermore, other circuits not shown in FIG. 9 may also be used to condition the signals in the transmitter and receiver. Some circuits in FIG. 9 may also be omitted. All or a portion of transceiver 920 may be implemented on an analog integrated circuit (IC), an RF IC (RFIC), a mixed-signal IC, etc.

Data processor 910 may perform various functions for wireless device 900, e.g., processing for transmitted and received data. A memory 912 may store program codes and data for data processor 910. Data processor 910 may be implemented on one or more application specific integrated circuits (ASICs) and/or other ICs.

As shown in FIG. 9, a transmitter and a receiver may include various analog circuits. Each analog circuit may be implemented in various manners and may include one or more MEMS varactors described herein. For example, MEMS varactors may be used in power amplifier 940, filter 942, duplexer/switch 944, LO generator 970, etc.

Figure 10:
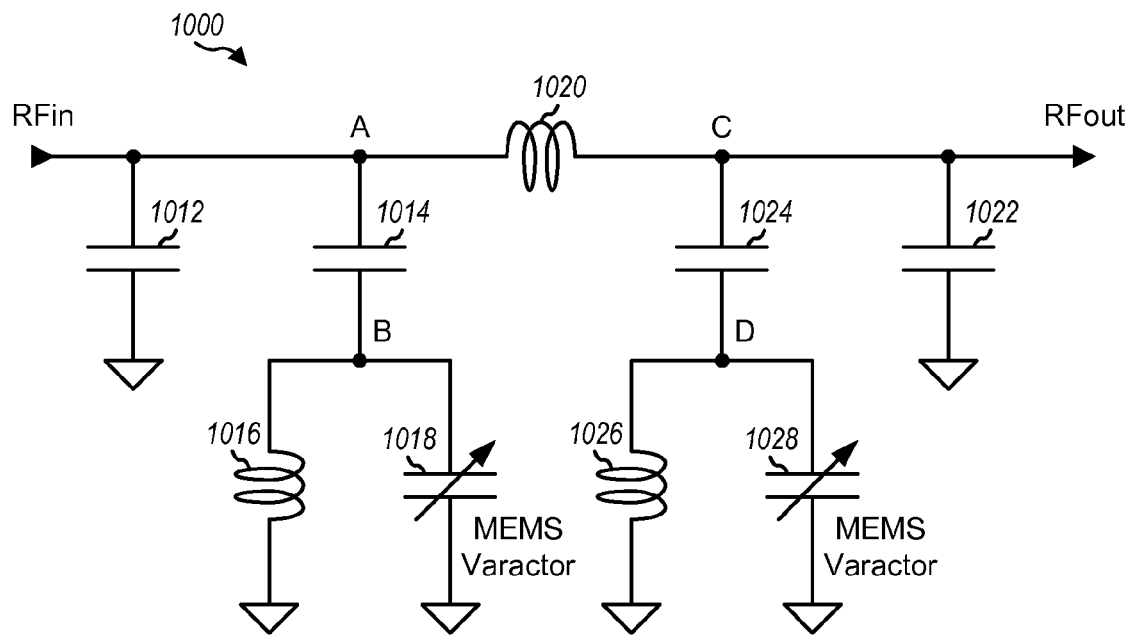
FIG. 10 shows a notch filter implemented with MEMS varactors.

FIG. 10 shows a schematic diagram of an exemplary design of a notch filter 1000 implemented with MEMS varactors. Notch filter 1000 may be used for filter 942 in FIG. 9. Within notch filter 1000, an input RF signal (RFin) is provided to node A, and an output RF signal (RFout) is provided via node C. A capacitor 1012 is coupled between node A and circuit ground, and a capacitor 1014 is coupled between nodes A and B. An inductor 1016 and a MEMS varactor 1018 are coupled in parallel between node B and circuit ground and form a first resonator. An inductor 1020 is coupled between nodes A and C. A capacitor 1022 is coupled between node C and circuit ground, and a capacitor 1024 is coupled between nodes C and D. An inductor 1026 and a MEMS varactor 1028 are coupled in parallel between node D and circuit ground and form a second resonator.

MEMS varactors 1018 and 1028 may each be implemented with MEMS varactor 100, 400, 700 or 800 in FIG. 1, 4, 7 or 8, respectively. This may then allow notch filter 1000 to handle a large input RF signal and provide good performance. For example, notch filter 1000 may be used for GSM, CDMA, WCDMA or some other cellular applications, and MEMS varactors 1018 and 1028 may need to handle high RF power in a range of 28 to 35 dBm (or 0.6 to 3.2 Watt), which may translate to a peak voltage in the range of about 30 to 75 V. In this case, the MEMS varactors should have a pull-in voltage of greater than 30V for CDMA/WCDMA and greater than 75V for GSM. This may allow the capacitance of the MEMS varactor to be tuned mostly by the DC voltage and to not be significantly influenced by a large RF signal.

In an aspect, a MEMS varactor may comprise first and second bottom plates and a top plate. The first bottom plate (e.g., bottom plate 120 or 130 in FIG. 1) may be electrically coupled to a first terminal, which may receive an input signal. The second bottom plate (e.g., bottom plate 130 or 120) may be electrically coupled to a second terminal, which may receive a DC voltage. The top plate (e.g., top plate 150) may be formed over the first and second bottom plates and may be electrically coupled to a third terminal. The DC voltage may cause the top plate to mechanically move and vary the capacitance observed by the input signal. The input signal may be an RF signal or a signal of some other type. The input signal may have a large signal swing, e.g., of more than 10 Volts.

In an exemplary design, the MEMS varactor may further comprise a third bottom plate (e.g., bottom plate 132 in FIG. 1) formed under the top plate and electrically coupled to the first terminal. In this exemplary design, which may correspond to mode 2 in FIG. 3C, the input signal may be applied to the first and third bottom plates, and the DC voltage may be applied to the second bottom plate. The first and third bottom plates (e.g., bottom plates 130 and 132) may be formed on two sides of the second bottom plate (e.g., bottom plate 120), which may be formed under a central area of the top plate.

In another exemplary design, the MEMS varactor may further comprise a third bottom plate (e.g., bottom plate 132 in FIG. 1) formed under the top plate and electrically coupled to the second terminal. In this exemplary design, which may correspond to mode 1 in FIG. 3B, the DC voltage may be applied to the second and third bottom plates, and the input signal may be applied to the first bottom plate. The second and third bottom plates (e.g., bottom plates 130 and 132) may be formed on two sides of the first bottom plate (e.g., bottom plate 120), which may be formed under the central area of the top plate.

In yet another exemplary design, at least one additional first bottom plate may be formed under the top plate and electrically coupled to the first terminal, e.g., as shown in FIGS. 4 and 5. At least one additional second bottom plate may also be formed under the top plate and electrically coupled to the second terminal, e.g., as also shown in FIGS. 4 and 5.

In an exemplary design, the first bottom plate (which receives the input signal) may have a smaller area than the second plate (which receives the DC voltage) in order to reduce changes in capacitance due to signal swing of the input signal, e.g., as shown in FIG. 6A. In another exemplary design, the second bottom plate may be thicker than the first bottom plate in order to reduce changes in capacitance due to signal swing of the input signal, e.g., as shown in FIG. 6B. In yet another exemplary design, bottom plates located progressively closer to the central area of the top plate may have progressively larger gap to the top plate, e.g., as shown in FIG. 6D.

In another aspect, a MEMS varactor may comprise first, second and third plates. The first plate (e.g., plate 720 in FIG. 7 or plate 820 in FIG. 8) may be electrically coupled to a first terminal, which may receive a first DC voltage. The second plate (e.g., plate 730 in FIG. 7 or plate 830 in FIG. 8) may be formed over the first plate and may be electrically coupled to a second terminal. The third plate (e.g., plate 740 in FIG. 7 or plate 840 in FIG. 8) may be formed over the second plate and may be electrically coupled to a third terminal, which may receive a second DC voltage. An input signal may be passed between the first and second terminals. The first and second DC voltages may cause the second plate to mechanically move and vary the capacitance observed by the input signal.

In an exemplary design, the input signal may be applied to the first terminal and capacitively passed to the second terminal, e.g., as shown in FIG. 7. In this exemplary design, the input signal may observe the capacitance between the first and second plates. The second DC voltage may be determined based on signal swing of the input signal. In another exemplary design, the input signal may be applied to the second terminal and capacitively passed to both the first and third terminals, e.g., as shown in FIG. 8. In this exemplary design, the input signal may observe the capacitance between the first and second plates plus the capacitance between the second and third plates.

In yet another aspect, an apparatus (e.g., a wireless communication device) may comprise a filter that receives an input signal and provides an output signal. The filter may include a MEMS varactor, which may comprise first, second and third plates. The first plate may be electrically coupled to a first terminal, the second plate may be electrically coupled to a second terminal, and the third plate may be electrically coupled to a third terminal. The MEMS varactor may have a variable capacitance determined by at least one DC voltage applied to at least one of the first, second and third terminals. The filter may further comprise an inductor coupled in parallel with the MEMS varactor and forming a resonator to attenuate the input signal at a designated frequency.

In an exemplary design, the first and second plates may be formed on a common layer and under the third plate, e.g., as shown in FIGS. 1 and 2. The at least one DC voltage may comprise a DC voltage applied to the first terminal to cause the third plate to mechanically move and vary the capacitance of the MEMS varactor. In another exemplary design, the second plate may be being formed over the first plate, and the third plate may be formed over the second plate, e.g., as shown in FIG. 7 or 8. The at least one DC voltage may cause the second plate to mechanically move and vary the capacitance of the MEMS varactor.

Figure 11:
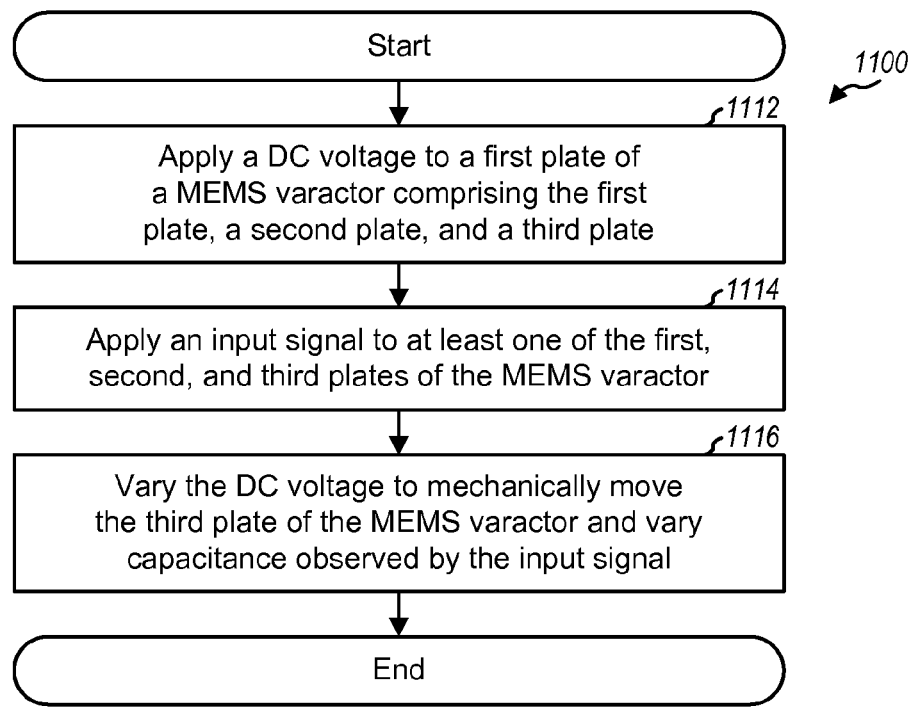
FIG. 11 shows a process for operating a MEMS varactor.

FIG. 11 shows an exemplary design of a process 1100 for operating a MEMS varactor. A DC voltage may be applied to a first plate of a MEMS varactor comprising the first plate, a second plate, and a third plate (block 1112). An input signal may be applied to at least one of the first, second, and third plates of the MEMS varactor (block 1114). The DC voltage may be varied to mechanically move the third plate of the MEMS varactor and vary the capacitance observed by the input signal (block 1116).

In an exemplary design, the input signal may be applied to the second plate of the MEMS varactor. The first and second plates (e.g., plates 120 and 130 in FIG. 1) may be formed under the third plate (e.g., plate 150 in FIG. 1).

In another exemplary design, the input signal may be applied to the first plate (e.g., plate 720 in FIG. 7). A second DC voltage may be applied to the second plate (e.g., plate 740). The third plate (e.g., plate 730) may be formed over the first plate, and the second plate may be formed over the third plate. The second DC voltage may be generated based on the signal swing of the input signal.

In yet another exemplary design, the input signal may be applied to the third plate (e.g., plate 830 in FIG. 8). A second DC voltage may be applied to the second plate (e.g., plate 840). The third plate may be formed over the first plate (e.g., plate 820), and the second plate may be formed over the third plate.

The MEMS varactors described herein may be fabricated with various MEMS process technologies known in the art. The MEMS varactors may be fabricated on a substrate (e.g., a glass or silicon substrate) and may be encapsulated in a suitable package. A substrate with MEMS varactors may also be packaged together with a semiconductor IC die. The MEMS varactors may also be fabricated on a semiconductor IC (e.g., a silicon based CMOS IC, a GaAs or InP based compound semiconductor IC, etc.) using semiconductor process technology.

An apparatus implementing any of the MEMS varactors described herein may be a stand-alone device or may be part of a larger device. A device may be (i) a stand-alone IC package, (ii) a set of one or more IC packages that may include memory ICs for storing data and/or instructions, (iii) an RFIC such as an RF receiver (RFR) or an RF transmitter/receiver (RTR), (iv) an ASIC such as a mobile station modem (MSM), (v) a module that may be embedded within other devices, (vi) a receiver, cellular phone, wireless device, handset, or mobile unit, (vii) etc.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the scope of the disclosure. Thus, the disclosure is not intended to be limited to the examples and designs described herein but is to be accorded the widest scope consistent with the principles and novel features disclosed herein.

What is claimed is:

1. A micro-electro-mechanical system (MEMS) varactor, comprising:
   a first bottom plate electrically coupled to a first terminal receiving an input signal;
   a second bottom plate electrically coupled to a second terminal receiving a DC voltage;
   an insulation layer extending over the first and second bottom plates; and
   a top plate formed over and spaced apart from the first and second bottom plates and electrically coupled to a third terminal, the DC voltage causing the top plate to mechanically move and vary capacitance observed by the input signal, wherein a stiffness of the portion of the top plate overlying the first bottom plate is greater than a stiffness of the portion of the top plate overlying the second bottom plate.

2. The MEMS varactor of claim 1, further comprising:
   a third bottom plate formed under the top plate and electrically coupled to the first terminal.

3. The MEMS varactor of claim 2, the first and third bottom plates being formed on two sides of the second bottom plate, and the second bottom plate being formed under a central area of the top plate.

4. The MEMS varactor of claim 1, further comprising:
   a third bottom plate formed under the top plate and electrically coupled to the second terminal.

5. The MEMS varactor of claim 4, the second and third bottom plates being formed on two sides of the first bottom plate, and the first bottom plate being formed under a central area of the top plate.

6. The MEMS varactor of claim 1, further comprising:
   at least one additional first bottom plate formed under the top plate and electrically coupled to the first terminal; and
   at least one additional second bottom plate formed under the top plate and electrically coupled to the second terminal.

7. The MEMS varactor of claim 1, the first bottom plate having a smaller area than the second bottom plate to reduce changes in capacitance due to signal swing of the input signal.

8. The MEMS varactor of claim 1, the second bottom plate being thicker than the first bottom plate to reduce changes in capacitance due to signal swing of the input signal.

9. The MEMS varactor of claim 1, the second bottom plate being thinner than the first bottom plate to increase capacitance, or capacitance tuning range, or both of the MEMS varactor.

10. The MEMS varactor of claim 1, with bottom plates located progressively closer to a central area of the top plate having progressively larger gap to the top plate.

11. The MEMS varactor of claim 1, the input signal comprising a radio frequency (RF) signal.

12. The MEMS varactor of claim 1, the input signal having a signal swing of more than 10 Volts.

13. The MEMS varactor of claim 1, wherein the first bottom plate is laterally displaced from the second bottom plate.

14. The MEMS varactor of claim 1, additionally including at least one support location where the top plate is supported, wherein the shortest distance between a portion of a plate coupled to the second terminal is shorter than the shortest distance between a portion of a plate coupled to the first terminal.

15. The MEMS varactor of claim 14, additionally including at least a second support location, wherein the support locations correspond to the locations of support posts which support the top plate.

16. An apparatus comprising:
   a filter to receive an input signal and provide an output signal, the filter including a micro-electro-mechanical system (MEMS) varactor comprising
   a first plate electrically coupled to a first terminal,
   a second plate electrically coupled to a second terminal,
   an insulation layer extending over the first and second plates; and
   a third plate electrically coupled to a third terminal, wherein the third plate is formed over and spaced apart from the first and second plates, and wherein a stiffness of the portion of the third plate overlying the second plate is greater than a stiffness of the portion of the third plate overlying the first plate, the MEMS varactor having a variable capacitance determined by at least one DC voltage applied to at least one of the first, second and third terminals to cause the third plate to move relative to the first and second plates.

17. The apparatus of claim 16, the filter further comprising an inductor coupled in parallel with the MEMS varactor and forming a resonator to attenuate the input signal at a designated frequency.

18. The apparatus of claim 16, the first and second plates being formed on a common layer and under the third plate, the at least one DC voltage comprising a DC voltage.

19. A method comprising:
applying a DC voltage to a first plate of a micro-electro-mechanical system (MEMS) varactor comprising the first plate, a second plate, an insulation layer formed over the first plate and the second plate, and a third plate located over and spaced apart from the first and second plates, wherein a stiffness of the portion of the third plate overlying the second plate is greater than a stiffness of the portion of the third plate overlying the first plate;
applying an input signal to at least one of the first, second, and third plates of the MEMS varactor; and
varying the DC voltage to mechanically move the third plate of the MEMS varactor and vary capacitance observed by the input signal.

20. The method of claim 19, the applying the input signal comprises applying the input signal to the second plate of the MEMS varactor, the first and second plates being formed under the third plate.

21. An apparatus comprising:
means for applying a DC voltage to a first plate of a micro-electro-mechanical system (MEMS) varactor comprising the first plate, a second plate, an insulation layer formed over the first plate and the second plate, and a third plate located over and spaced apart from the first and second plates, wherein a stiffness of the portion of the third plate overlying the second plate is greater than a stiffness of the portion of the third plate overlying the first plate;
means for applying an input signal to at least one of the first, second, and third plates of the MEMS varactor; and
means for varying the DC voltage to mechanically move the third plate of the MEMS varactor and vary capacitance observed by the input signal.

22. The apparatus of claim 21, wherein the first plate is laterally displaced from the second plate.

23. The apparatus of claim 21, wherein a distance between the first plate and the support location closest to the first plate is greater than the longest distance between a plate coupled to the means for applying an input signal and the support location closest to the plate coupled to the means for applying an input signal.

24. A micro-electro-mechanical system (MEMS) varactor, comprising:
at least a first plate configured to receive an input RF signal;
a second plate laterally offset from the first plate and configured to receive a DC voltage;
a movable plate extending over and spaced apart from the first and second plates, wherein the movable plate is supported at more than one support location, wherein a stiffness of the portion of the movable plate overlying the first plate is greater than a stiffness of the portion of the movable plate overlying the second plate, wherein applying the DC voltage to the second plate causes the movable plate to move, and wherein a distance between the second plate and the support location closest to the second plate is greater than the longest distance between a plate configured to receive an input RF signal and the support location closest to the plate configured to receive an input RF signal.

25. The MEMS varactor of claim 24, wherein a size of the first plate is less than a size of the second plate.

* * * * *